Patented Oct. 22, 1929

1,732,218

UNITED STATES PATENT OFFICE

HANS BURMEISTER, OF BERLIN, GERMANY, ASSIGNOR TO PYRENE-MINIMAX CORPORATION, A CORPORATION OF DELAWARE

FOAM-FORMING COMPOSITION

No Drawing. Application filed October 27, 1927, Serial No. 229,256, and in Germany April 24, 1924.

The present invention relates to the production of foam for fire extinguishing purposes and has for an object to make improved provision for the use of aluminum sulphate as one of the foam forming chemicals.

Fire foam is produced by combining water with acid and alkali in suitable proportions to form foam, preferably, a neutral or slightly acid foam. The use of aluminum sulphate as an acid in the combination has certain advantages as forming a more lasting foam but when it is stored for a long time before actual use in the form of a powder there is a risk that at the time of use the powder will have become somewhat damp or slimy, or that when, in use, the water is added the sulphate will tend to form a slime instead of dissolving quickly and readily in the water. This difficulty is especially found when the foam forming apparatus is of the type in which the water is supplied in a stream engaging a large body of powder.

The present invention makes provision for combining with the aluminum sulphate another acid which acts as a booster and facilitates the dissolving of the sulphate in water in a way to reduce the risk of ineffective operation due to deterioration of the sulphate. The sulphate is combined with another suitable acid such as tartaric acid, citric acid or oxalic acid, or a mixture of them, with the result that even after long storage under adverse conditions, it will dissolve readily in water and the resulting acid solution may be combined with a suitable alkali to form foam.

The sulphate and other acid or acids may be combined, for example, in the proportion of seventy-five to ninety (75 to 90) parts of sulphate and twenty-five to ten (25 to 10) parts of acid. If all of the foam forming chemicals are to be combined in one powder, such a powder may contain, for example, eighty-five (85) parts of aluminum sulphate and fifteen (15) parts of tartaric acid, citric acid and oxalic acid, or any of them, together with sufficient sodium carbonate to form a neutral or slightly acid foam. The combined powder will operate effectively even after long storage and when the foam forming apparatus fails to afford the most effective mechanical mixing of the water and foam forming materials.

The foregoing description of a particular embodiment of the invention is illustrative merely and is not intended as defining the limits of the invention.

I claim:

1. The method of producing foam for fire extinguishing purposes which comprises maintaining in dry powdered form a mixture of foam forming chemicals including aluminum sulphate and an acid adapted to facilitate the dissolving in water of the aluminum sulphate, and combining said mixture with water at the time of use to form foam.

2. The method of producing foam for fire extinguishing purposes which comprises maintaining in dry powdered form a mixture of foam forming chemicals including 75 to 90 parts of aluminum sulphate and 10 to 25 parts of acid adapted to facilitate the dissolving in water of the aluminum sulphate, and combining said mixture with water at the time of use to form foam.

3. The method of producing foam for fire extinguishing purposes which comprises maintaining in dry powdered form a mixture of foam forming chemicals including 85 parts of aluminum sulphate and 15 parts of tartaric acid, citric acid and oxalic acid together with an alkali, and combining said mixture with water at the time of use to form foam.

4. The method of producing foam for fire extinguishing purposes which comprises maintaining in dry powdered form a charge of foam forming chemicals including aluminum sulphate and an acid adapted to facilitate the dissolving in water of the aluminum sulphate, and directing a stream of water into said charge.

5. The method of producing foam for fire extinguishing purposes which comprises maintaining in dry powdered form a mixture of foam forming chemicals including aluminum sulphate and an acid adapted to facilitate the dissolving in water of the aluminum sulphate togther with an alkali, and combining said mixture with water to form foam.

6. The method of producing foam for fire extinguishing purposes which comprises maintaining in dry powdered form a charge of foam forming chemicals including aluminum sulphate, an acid adapted to facilitate the dissolving in water of the aluminum sulphate together with an alkali, and directing a stream of water into said charge to form foam.

7. A charge for fire extinguishing apparatus comprising a mixture of aluminum sulphate and organic acid and an alkali, all in powder form.

8. A charge for fire extinguishing apparatus comprising a dry mixture of foam forming chemicals including 75 to 90 parts of aluminum sulphate, 10 to 25 parts of other acid, and an alkali in proportion to form foam when mixed with water.

9. A charge for fire extinguishing apparatus comprising a dry mixture containing approximately 85 parts af aluminum sulphate and 15 parts of other acid.

HANS BURMEISTER.